United States Patent [19]

Pattock

[11] Patent Number: 5,181,592
[45] Date of Patent: Jan. 26, 1993

[54] SHIFT LEVER INTERLOCK SYSTEM
[75] Inventor: Greg R. Pattock, Spring Lake, Mich.
[73] Assignee: Sparton Corporation, Jackson, Mich.
[21] Appl. No.: 535,754
[22] Filed: Jun. 11, 1990
[51] Int. Cl.[5] .............................................. B60K 41/28
[52] U.S. Cl. ................................ 192/4 A; 74/483 R; 74/878; 70/248; 180/271
[58] Field of Search ...................... 192/4 A, 4 R, 4 C; 74/483 R, 483 K, 878; 70/245, 247, 248, 254; 180/271; 200/61.88, 537, 538, 540; 340/455, 663

[56] References Cited

U.S. PATENT DOCUMENTS

| 3,463,277 | 8/1969 | Allori et al. | 192/4 R |
|---|---|---|---|
| 3,490,255 | 1/1970 | Wight et al. | 70/252 |
| 3,539,040 | 11/1970 | Edwards | 192/4 B |
| 3,601,231 | 8/1971 | Kolacz et al. | 188/69 |
| 3,642,103 | 2/1972 | Schott | 192/4 A |
| 3,673,588 | 6/1972 | Riff | 340/455 |
| 3,773,156 | 11/1973 | Nyquist | 192/0.094 |
| 3,780,839 | 12/1973 | Schroeder | 192/4 A |
| 3,830,328 | 8/1974 | Schaefer et al. | 180/271 |
| 3,939,940 | 2/1976 | Sasabe et al. | 180/269 |
| 3,942,614 | 3/1976 | Thompson | 192/4 A |
| 4,187,935 | 2/1980 | O'Hearn | 192/4 A |
| 4,281,736 | 8/1981 | Lizzio | 180/271 |
| 4,298,108 | 11/1981 | Hutchinson | 192/13 R |
| 4,421,214 | 12/1983 | Sellmeyer | 192/4 A |
| 4,433,763 | 2/1984 | Lizzio | 192/4 A |
| 4,473,141 | 9/1984 | Mochida | 192/1.1 |
| 4,572,340 | 2/1986 | Pierce | 192/4-C |
| 4,871,994 | 10/1989 | Takeda et al. | 200/61.88 X |
| 4,880,092 | 11/1989 | Kito et al. | 192/4 A |
| 4,887,702 | 12/1989 | Ratke et al. | 192/4 A |
| 4,905,802 | 3/1990 | Gotoh | 192/4A |
| 4,909,096 | 3/1990 | Kobayashi | 192/4 A X |
| 4,932,493 | 6/1990 | Sakurai et al. | 180/271 |
| 4,934,496 | 6/1990 | Barske et al. | 192/4 A |
| 4,942,937 | 7/1990 | Amberger et al. | 180/271 |
| 4,947,967 | 8/1990 | Kito et al. | 192/4 A |
| 4,966,262 | 10/1990 | Mierzkowski | 192/4 A |
| 4,967,883 | 11/1990 | Kito et al. | 192/4 A |
| 5,031,737 | 7/1991 | Dzioba et al. | 192/4 A |
| 5,036,962 | 8/1991 | Amagasa | 192/4 A |

OTHER PUBLICATIONS

Strasser, F. "9 More Ways to Change Straight-Line Direction", In: Chironis, N. P., Mechanims, Linkages and Mechanical Controls (New York, McGraw-Hill, 1965) p. 82, TJ185C4.

Primary Examiner—Richard Lorence
Attorney, Agent, or Firm—Reising, Ethington, Barnard, Perry & Milton

[57] ABSTRACT

The shift lever interlock system combines a shift lever position signal, interlock actuator extend and retract signals and vehicle system input signals (e.g., representing the service brake, ignition key-in, ignition circuit and vehicle battery voltage level) in a logic control circuit to lock the shift lever in the "Park" position, except if the ignition key is not in the "Lock" position and the service brake is depressed (applied) or the voltage of the battery is too low. The interlock system is not actuated to lock the shift lever in position when the shift lever is in positions other than as retained in the "Park" position by the detent mechanism.

40 Claims, 4 Drawing Sheets

SHIFT LEVER INTERLOCK SYSTEM

FIELD OF THE INVENTION

The present invention relates to a transmission shifter interlock system for preventing shifting from a non-drive position, such as the "Park" position, until certain vehicle system inputs are placed in predetermined states or conditions.

BACKGROUND OF THE INVENTION

An improved vehicle transmission shift control mechanism having a service brake and shift lever interlock system is described in copending U.S. Pat. application Ser. No. 314,717 filed Feb. 23, 1989, of common assignee herewith.

The interlock system described in that patent application includes a shift lever pivotal between a "Park" position and other operative positions such as drive, reverse, neutral, etc. The shift lever is selectively retained in one of these positions by a detent mechanism which releasably couples the shift lever and a detent plate. The detent mechanism is manually released out of coupling relation between the detent plate and shift lever to free the shift lever for repositioning.

An electromechanical mechanism, including a solenoid and a pivotal bellcrank locking lever connected to an ignition mechanism via an actuating cable, is employed to control locking/unlocking of the shift lever in the "Park" position in response to the operational mode of the service brake system of the vehicle. In particular, a service brake responsive switch is employed in combination with other switches, such as the ignition switch and shift lever position responsive switch, to control locking/unlocking of the shift lever in the "Park" position when the ignition switch is in the "Start" or "Run" position. These switches are employed in a logic control circuit in such a manner that the shift lever is locked in the "Park" position when the ignition switch is closed (e.g., in the "Start" or "Run" position) and the service brake pedal is in the brake released mode. The logic control circuit does not effect locking of the shift lever under other conditions or positions of these components.

It is an object of the present invention to provide a shift lever interlock system for a vehicle which eliminates the need for a bellcrank locking lever and associated mechanical components, especially the cable that connects the bellcrank locking lever to the ignition mechanism of the vehicle.

It is another object of the invention to provide such a shift lever interlock system which interlocks the shift lever electronically with ignition circuit, ignition key-in, service brake system, and battery system input signals such that the shift lever is locked in the "Park" position unless the ignition key is inserted or the ignition switch is unlocked and the service brake system is in a brake applied mode or unless the battery voltage level is below a predetermined level.

It is a further object of the present invention to provide a shift lever interlock system having a bidirectional interlock actuator providing self-generated extend and retract signals which are logically combined with the aforementioned other vehicle inputs such that the interlock actuator is actuable until the extend position (corresponding to shift lever locking) or the retract position (corresponding to shift lever unlocking) is reached and remains at rest at one of these positions until reactuated to move to the other of these positions.

It is a further object of the invention to provide a shift lever interlock system wherein the shift lever position, battery voltage level, ignition key-in, ignition circuit and service brake system are monitored for input to the logic control circuitry of the interlock system.

It is a further object of the invention to provide a shift lever interlock system wherein a locking member or plunger of the interlock actuator resides beneath the "Park" detent when moved to the extend position to lock the shift lever in the "Park" position to insure the interlock system functions only with respect to the "Park" position and not other positions of the shift lever.

SUMMARY OF THE INVENTION

The invention contemplates a shift lever interlock system for a vehicle having a shift lever movable between a non-drive position (e.g., "Park" position) and a drive position (e.g., drive, reverse, etc.) and detent means for releasably retaining the shift lever in a selected position. The interlock system includes an electrical actuator for moving a locking member (e.g., a plunger) to a locking position relative to the detent means when the shift lever is retained in the non-drive position by the detent means so as to prevent the driver from moving the shift lever from the non-drive position. The locking member is positioned beneath the detent means in the non-drive position such that the interlock system can function only with respect to the non-drive position (e.g., "Park" position) and not other shift lever positions. The actuator includes means for providing a first input signal (e.g., an extend input signal) representative of the locking member being in the locking position and means for providing a second input signal (e.g., a retract input signal) representative of the locking member being in an unlocked position relative to the detent means.

In addition to the first and second input signals, the interlock system includes means for providing a shift lever position input signal representative of the shift lever being retained in the non-drive position (e.g., "Park" position) by the detent means and, in addition, means for providing at least one vehicle system input signal representative of a vehicle system being in a predetermined condition. The vehicle system input signal preferably comprises an ignition switch (unlock) input signal, ignition key-in input signal, a service brake applied input signal and a battery low voltage input signal.

A control circuit includes a plurality of gates for logically combining the aforementioned vehicle system input signals into a control signal for actuating the electrical actuator in an appropriate direction such that the shift lever, as retained in the non-drive position by the detent means, is locked in position except if the vehicle system signal is in the predetermined condition. The interlock system will not lock the shift lever if the shift lever is in any position other than as retained in the non-drive position by the detent means. Moreover, the interlock system will not lock the shift lever in any position in the event the battery voltage falls below a predetermined level.

The aforementioned objects and advantages of the invention will become more readily apparent from the following detailed description taken with the accompanying drawings.

DETAILED DESCRIPTION OF THE INVENTION

Figure 1:
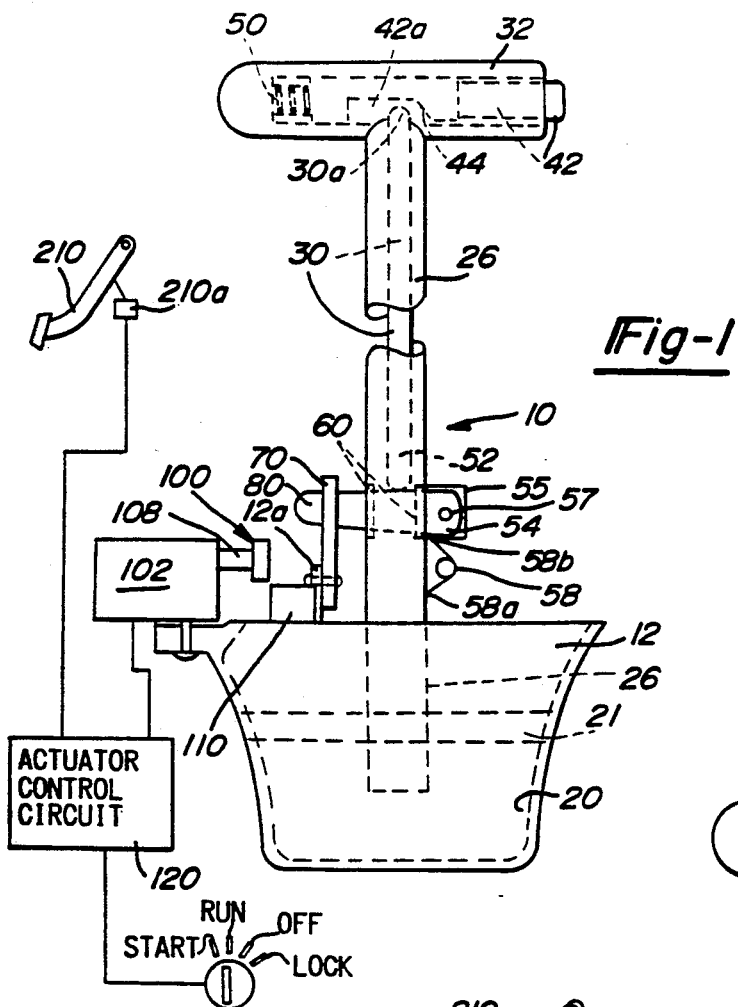
FIG. 1 is front elevational view of a shift lever interlock system in accordance with the invention with some components shown schematically and with the "Park" switch deleted to illustrate the shift lever unlocked as a result of the locking member being retracted to an unlocking position by the interlock actuator.
Figure 2:
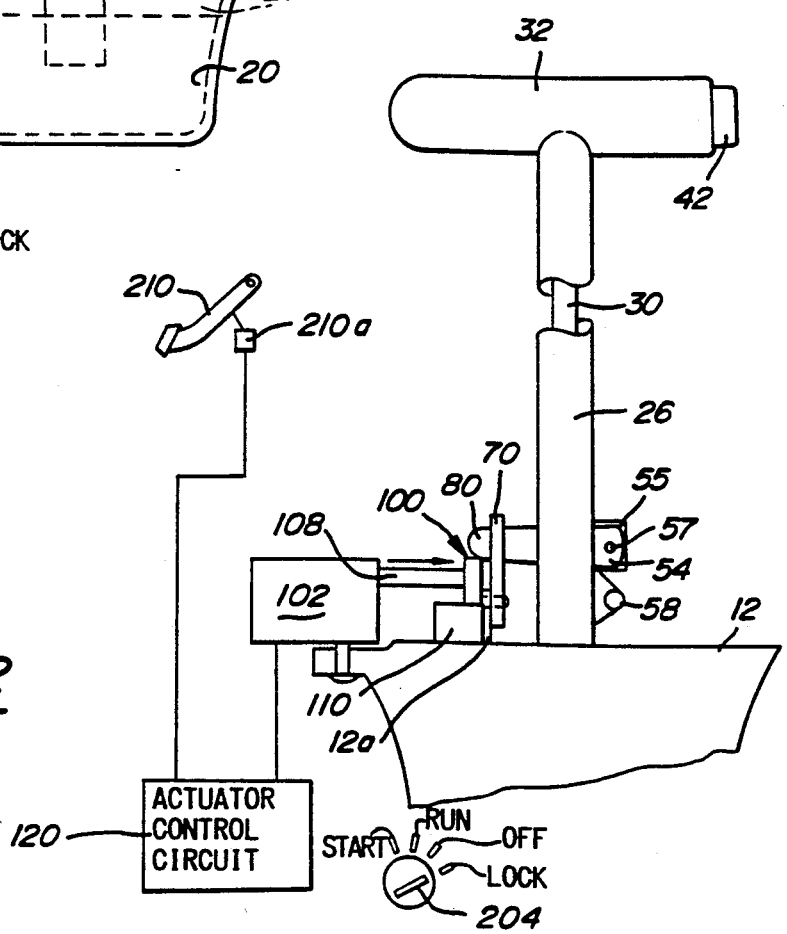
FIG. 2 is a view similar to FIG. 1 with the shift lever shown locked in "Park" position as a result of the locking member being extended to the locking position by the interlock actuator.
Figure 3:
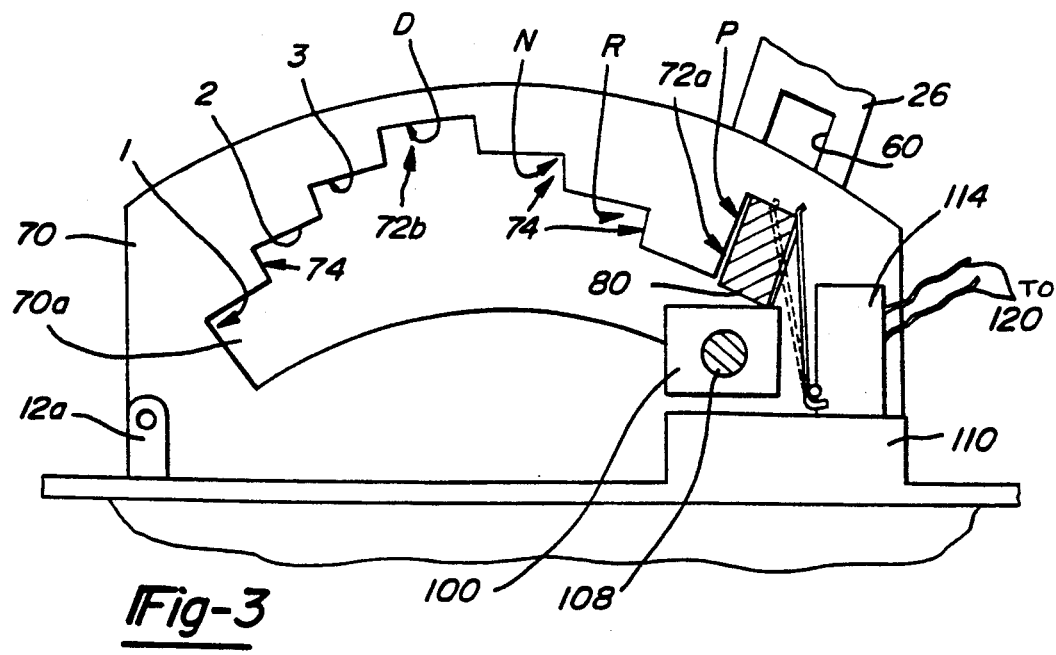
FIG. 3 is a sectioned side elevation of the interlock system illustrating the "Park" switch and the pawl of the shift lever positioned in the "Park" slot of the detent plate with the manual pushbutton shaft of the shift lever released.

Referring to FIGS. 1-3, a transmission shift control mechanism 10 is shown including a support base or frame 12 adapted to be secured to a vehicle body member, such as a floor pan (not shown). For example, the shift control mechanism can be of the type currently used on the Ford Aerostar minivan manufactured by Ford Motor Company.

The base or frame 12 includes a well 20 having a stationary pivot shaft 21 on which a hollow, upstanding shift lever 26 is mounted for pivotal movement in known manner.

Received for sliding movement in the hollow shift lever 26 is an elongate actuator rod 30. The actuator rod 30 extends into a handle 32 where nose 30a of the actuator rod 30 is positioned in a recess 42a in a pushbutton shaft 42 slidably received in the handle 32 for movement perpendicular to the rod 30.

Recess 42a includes a cam surface 44 that forces the actuator rod 30 downwardly in the shift lever 26 when the pushbutton shaft 42 is pressed toward the handle by the vehicle operator (i.e., the driver). A coil return spring 50 is disposed around the pushbutton shaft 42 and biases the shaft 42 away from the handle 32 in known fashion when manual pressure on the pushbutton is released. A manual pushbutton shaft on a hollow shift lever of the type described hereinabove is shown in copending application Ser. No. 314,717 of common assignee herewith, the teachings of which are incorporated herein to this end.

As best seen in FIGS. 1 and 2, the opposite (lower) end of the actuator rod 30 includes a depending nose 52 that engages a spring biased pawl or detent engaging member 54 pivotably mounted on the hollow shift lever 26; namely, pawl ember 54 is pivotably mounted on a shift lever bracket 55 by pivot pin 57. The pawl member 54 extends through cross-slots 60 in the shift lever 26 beneath the nose 52 of the actuator rod 30. A coil spring 58 is provided adjacent the pawl member 54 and includes a lower end 58a engaged on the shift lever 26. The coil spring 58 includes an upper end 58b engaged to the pawl member 54 in such a manner that the pawl member 54 is biased upwardly against the nose 52 but can be depressed downwardly upon the driver's pressing the pushbutton shaft 42 to shift the transmission as is known.

The pawl member 54 extends through an opening 70a in stationary detent plate 70 where the pawl member terminates in a pawl 80. The detent plate 70 is fastened to upstanding lugs 12a of the frame 12 by suitable means, such as rivets. The pawl 80 is adapted to releasably couple the shift lever 26 to the detent plate 70. To this end, detent plate 70 includes a plurality of notches or slots 72a, 72b, FIG. 3, into which the pawl 80 can be releasably coupled or engaged to place and retain the shift lever 26 in the "Park" position P (slot 72a) and drive position D (slot 72b), and further includes stop surfaces 74 for positioning and retaining the pawl 80 in a reverse position R, neutral position N, drive three position 3, drive two position 2 and drive one position 1 (see FIG. 3) in known manner for the Ford Aerostar minivan.

To reposition the shift lever 26 for one of the positions P, D, R, N, 1, 2, 3 to another, the driver depresses the pushbutton shaft 42 toward handle 32 and pivots the shift lever 26 to the desired one of the positions P, D, R, N, 1, 2, 3. Depressing the pushbutton shift 42 causes actuator rod 30 to release or decouple pawl 80 downwardly out of engagement with the detent plate 70. When the shift lever 26 is in the desired operative position, the driver releases the pushbutton shaft 42 and spring 58 biases the pawl member 54 upwardly to couple or engage pawl 80 with the detent plate 70 (i.e., in appropriate slot or stop surface) to releasably retain the shift lever 26 at the selected operative position P, R, N, D, 1, 2, 3.

The manually operable detent means thus includes the spring biased pawl member 54, the detent plate 70 as well as the actuator rod 30 and associated components (e.g., pushbutton shaft 42) of the shift lever 26.

In accordance with the invention, an interlock system is provided to prevent the shift lever 26 from being shifted out of the "Park" position until certain vehicle systems have been placed in predetermined states or conditions as will be explained. The interlock system, in effect, has two states, an unlocked state and a locked state. When the interlock system is in the unlocked state, the shift lever 26 can be freely pivoted to the various positions P, D, R, N, 1, 2, 3 as described hereinabove by the driver's pressing the pushbutton shaft 42 to decouple the pawl 80 from the detent plate 70 and pivoting the shift lever 26. In the locked state, the pawl 80 is held in the "Park" slot 72a of the detent plate 70 by the locking member 100 (e.g., plunger) of an electrical motor driven-linear actuator 102 of the interlock system, FIGS. 1-5.

Figure 4:
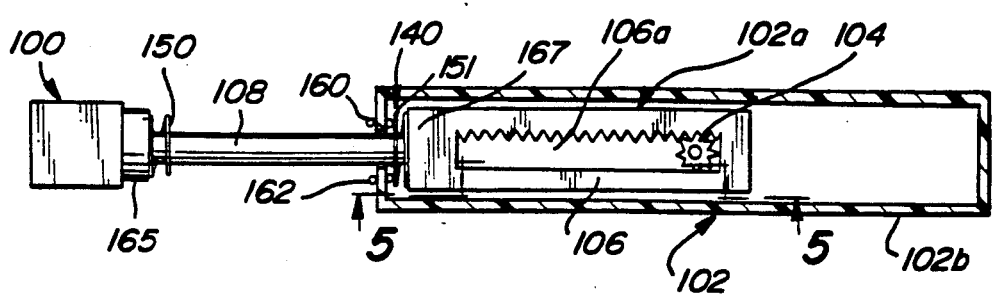
FIG. 4 is a sectioned elevation of the electrical interlock actuator showing the rack/pinion mechanism for moving the locking member.
Figure 5:
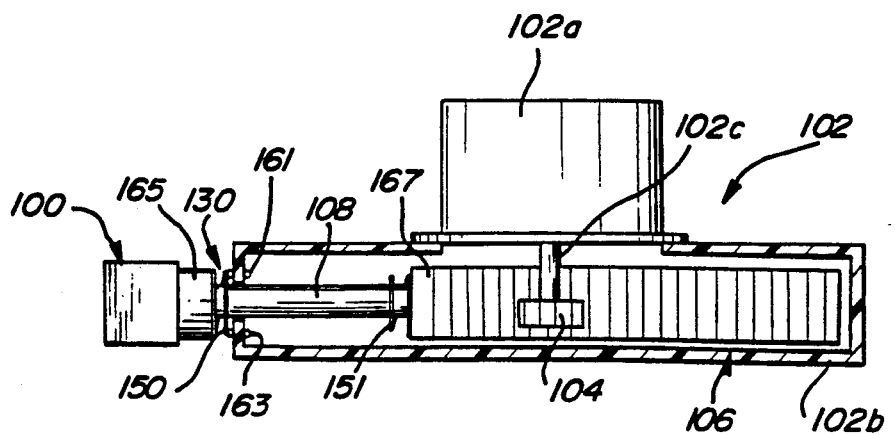
FIG. 5 is sectioned side elevation of the components shown in FIG. 4.

In particular, the electrical actuator 102 comprises a commercially available bidirectional rotary DC electrical motor 102a driven by the electrical power system of the motor vehicle. Referring to FIGS. 4-5, the actuator housing 102b encloses a motor output shaft 102c having a toothed pinion 104 thereon. The pinion 104 is engaged in mesh with a linearly reciprocable rack 106. In particular, the pinion 104 resides in an internal channel 106a of the rack 106 such that the teeth of the pinion 104 and the teeth of rack 106 are in mesh. Rotation of the pinion 104 causes linear sliding of the rack 106 in one direction or the other depending upon the direction of rotation of the pinion 104. A shaft 108 is fastened to an end of the rack 106, FIGS. 4-5, and the locking member 100 is, in turn, connected to or formed integrally with the outboard end of the shaft 108.

When the shaft 108 is positioned in the extend position (FIG. 2), the locking member 100 is positioned beneath the pawl 80 positioned in the "Park" slot 72a (FIG. 3) to lock the shift lever 26 in the "Park" position. In the locking position, the locking member 100 is supported on a riser block 110 mounted on or integral with the frame 12. Positioning of the locking member 100 beneath the pawl 80 and the "Park" slot 72a in this manner allows the interlock system to function only with respect to the "Park" position of the shift lever 26. When the shaft 108 is positioned in the retract position (FIG. 1), the locking member 100 is withdrawn from beneath the pawl 80 to permit the downward movement thereof required to shift the shift lever 26 out of the "Park" position as will be explained.

To insure that the interlock system is actuated to the locked state only when the pawl 80 is nested upwardly within the "Park" slot 72a (i.e., shift lever 26 in the "Park" position with the pushbutton shaft 42 released), a "Park" switch 114, FIG. 3, is provided adjacent the pawl 80 for actuation by the pawl 80 when the pawl 80 is nested in the "Park" slot 72a. In effect, the "Park" switch monitors the position of the pawl 80 and thus the position of the shift lever 26 relative to the "Park" position (i.e., "Park" slot 72a). If the pawl 80 is in any position other than nested in the "Park" slot 72a (i.e., the shift lever 26 is retained in the "Park" position by the detent means), the interlock system will not be placed in the locked state as a result of the "Park" switch 114 not being actuated. As will be explained, the "Park" switch 114 may be normally open or normally closed depending upon the control circuit employed to control the electrical actuator 102.

Figure 7:
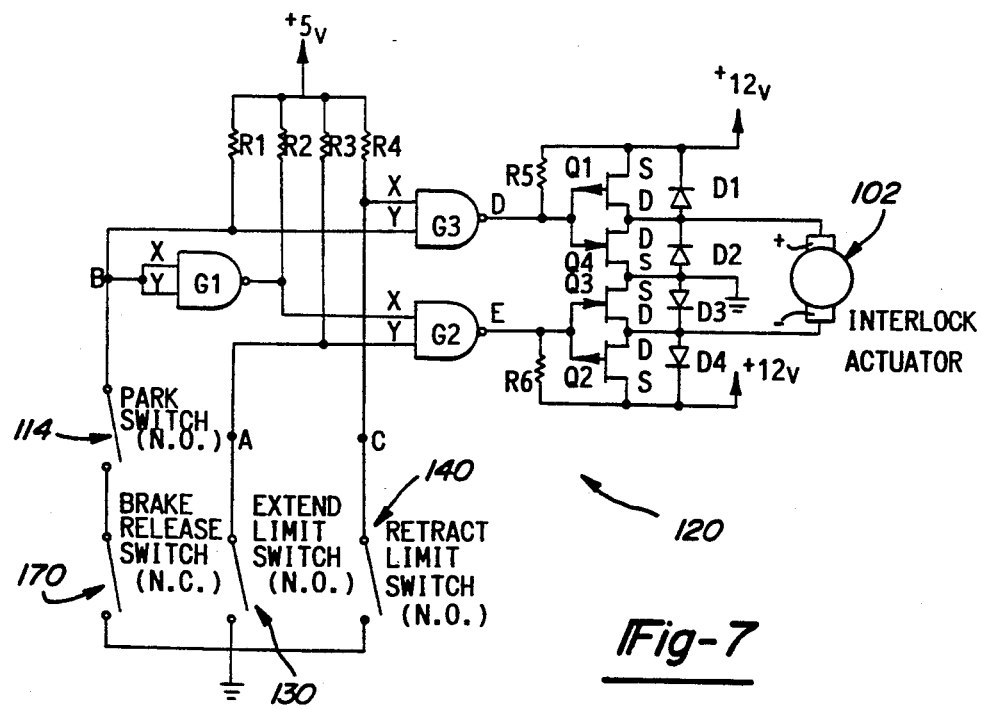
FIG. 7 is a schematic circuit diagram of one embodiment of a control circuit of the invention.

The interlock actuator 102 is controlled by a control circuit 120 shown in FIG. 7. The control circuit 120 has three input signals, A, B, and C that are used to determine the motion of the interlock actuator 102. Two input signals, A and C are taken from the interlock actuator 102. The A input signal (first input signal) represents an extend limit switch 130, while the C input signal (second input signal) represents a retract limit switch 140. The switches 130,140 are shown in FIGS. 4-5. Switch 130 comprises a conductive spring 150 mounted on shaft 108 for movement therewith and two isolated electrical contacts 160,162 on housing 102b. Similarly, switch 140 comprises a conductive spring 151 mounted on shaft 108 for movement therewith and two isolated electrical contacts 161,163 on housing 102b. When the locking member 100 of the interlock actuator 102 is fully retracted (FIG. 5), the spring 150 touches the contacts 160,162, providing a retract input signal (second input signal) which indicates the locking member has reached a retract limit (unlocking position). When the locking member 100 is fully extended (FIG. 4) the spring 151 touches the contacts 161,163, providing an extend input signal (first input signal) which indicates that the locking member has reached an extend limit (locking position).

Since the shaft 108 and actuator housing 102b carry the electrical contacts 160,161,162,163 and associated contacting springs or members 150,151, the shaft 108 and housing 102b are made of an electrical insulating material such as plastic. The locking member 100 and the rack 106 are also made of plastic. Rubber stopper members 165,167 on shaft 108 and rack 106, respectively, are disposed adjacent and engage a respective spring 150,151 when that spring touches the respective contacts 160,162 and 161,163.

The third input, the B input signal, controls the direction of motion of the locking member 100. When the B input is in a low state, the locking member 100 is extended to the extend limit (FIG. 4) and when the B input is in a high state, the locking member 100 is retracted to the retract limit (FIG. 5). The B input signal attains a low state only if the "Park" switch 114 is closed (shift lever 26 is in the "Park" position with pushbutton shaft 42 released) and the normally closed (N.C.) release switch 170 is closed (not depressed). In FIG. 7, the release switch 170 represents schematically a logical combination of vehicle system input signals. As will be explained in more detail (with respect to FIG. 8) the release switch 170 represents a logical combination of vehicle system input signals such as battery voltage level, ignition switch position, ignition key in/-out and service brake signals. FIG. 7 illustrates the release switch 170 schematically for purposes of simplicity at this point in the description of the invention.

Opening the release switch 170 simulates the vehicle system signals being in a state or condition to make the locking member 100 retract. The B input signal attains a high state if the "Park" switch 114 is open (shifter lever 26 not retained in the "Park" position by the detent means) or the release switch 170 is open (depressed). The three inputs are logically combined by gates G1, G2, and G3 to produce the outputs D and E. Resistors R1, R2, R3, R4 are pull-up resistors to 5 volts. Table A describes the action of gates G1, G2 and G3 given inputs X and Y.

TABLE A

| INPUT X | INPUT Y | OUTPUT |
| --- | --- | --- |
| low | low | high |
| low | high | high |
| high | low | high |
| high | high | low |

From this, Table B is constructed to describe the outputs D and E as functions of inputs A, B and C.

TABLE B

| INPUT A | INPUT B | INPUT C | OUTPUT D | OUTPUT E |
| --- | --- | --- | --- | --- |
| * low | low | low | high | high |
| * low | low | high | high | high |
| low | high | low | high | high |
| low | high | high | low | high |
| high | low | low | high | low |
| high | low | high | high | low |
| high | high | low | high | high |
| high | high | high | low | high |

* Not possible since the A input and B input can not be low at the same time.

Since the outputs D and E are logical outputs of the gates G1, G2, G3, the outputs D and E cannot supply enough electrical power to drive the electrical motor 102a of the interlock actuator 102. Motor driving circuitry C1 is needed to interface the gates G1, G2, G3 to the interlock actuator 102. Diodes D1, D2, D3, D4, and transistors Q1, Q2, Q3, and Q4 provide this function. Diodes D1, D2, D3, and D4 provide protection against back EMF generated by the interlock actuator 102. Resistors R5 and R6 are pull-up resistors to 12 volts.

Transistors Q1 and Q2 comprise insulated gate field effect transistors where current flows from sources S to drain D when the source to gate voltage is greater than a built in threshold (e.g., 2.5 volts). Configured as shown in FIG. 7, transistors Q1 and Q4 are alternately conducting; i.e., when Q1 is conducting, Q4 is not and when 44 is conducting, Q1 is not. Transistors Q2 and Q3 function similarly. When the output of gate G3 is in a high state, the '+' terminal of the interlock actuator 102 is conducting to ground since Q1 transistor is 'off' (vag- =OV where vag is voltage at gate) and transistor Q4 is 'on' (vag=12 V). When the output of gate G3 is in a low state, the '+' terminal of the interlock actuator 102 is conducting to +12 volts, since transistor Q1 is 'on' and transistor Q4 is 'off'. The same is true for the output of gate G2 and transistors Q2 and Q3. The interlock actuator 102 becomes energized by the vehicle electrical power system if the '+' terminal and the '—' terminal are at different voltages. With the circuit of FIG. 7, only two voltages across the interlock actuator 102 are possible; namely, 0 volts and 12 volts. However, the 12 volts can be applied from the '+' to '—' or '—' to '+' terminals of the actuator 102. From this, Table C is generated.

TABLE C

| OUTPUT D | OUTPUT E | INTERLOCK ACTUATOR |
|---|---|---|
| low | low | rest |
| low | high | extend |
| high | low | retract |
| high | high | rest |

The overall function of the control circuit 120 shown in FIG. 7 is to place the interlock system in the locked state only if the shifter lever 26 is in the "Park" position with the pushbutton shaft 42 released such that the shift lever 26 is retained in the "Park" position by the detent means, and the release switch 170 is not depressed (not open). Table D summarizes functions of the interlock system described hereinabove.

TABLE D

| SHIFTER | RELEASE SWITCH | INTERLOCK |
|---|---|---|
| not in park | any position | disengaged |
| in park, thumb depressed | any position | disengaged |
| in park, thumb released | depressed | disengaged |
| in park, thumb released | not depressed | engaged |

Figure 8:
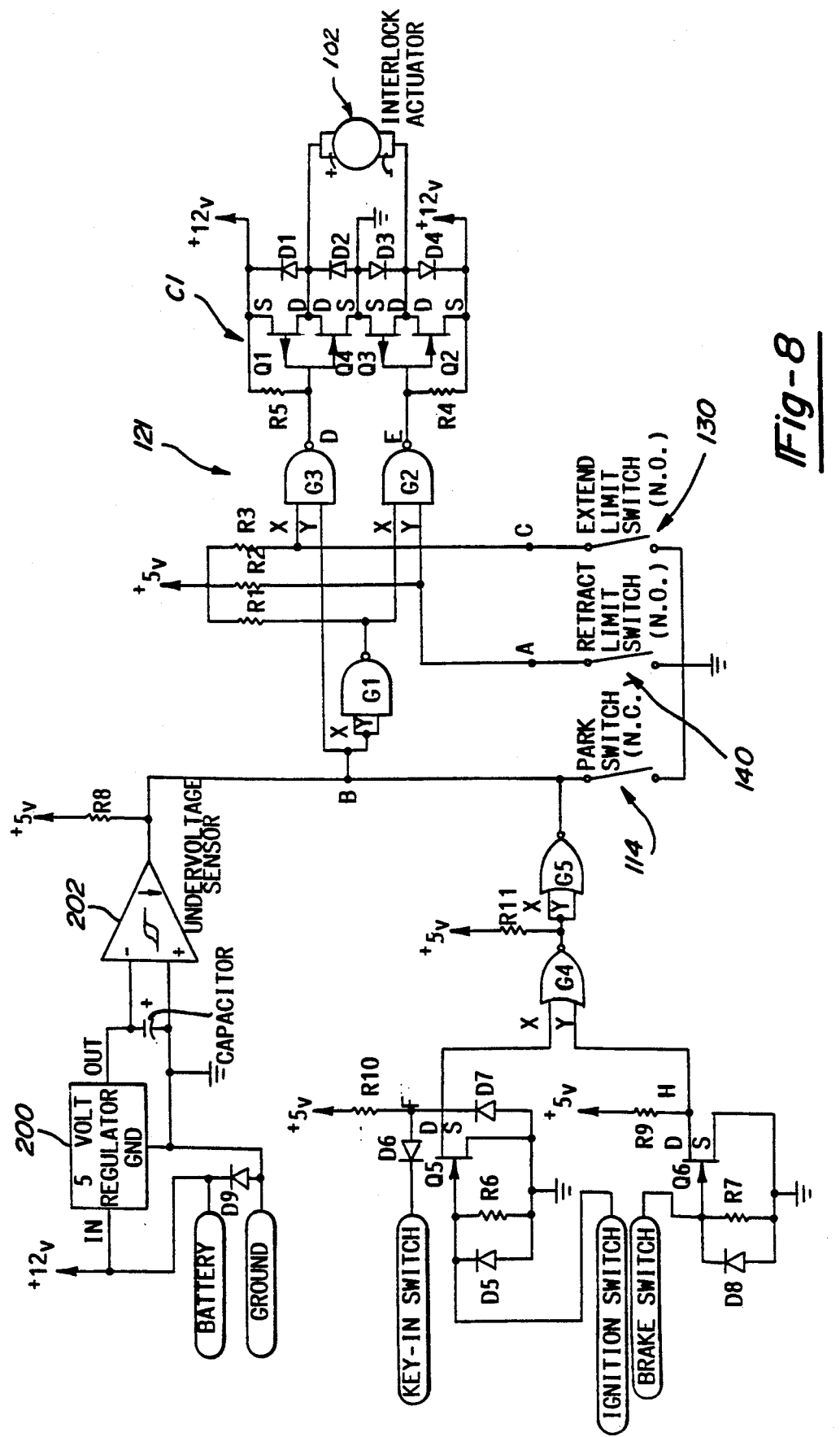
FIG. 8 is a schematic circuit diagram of another embodiment of control circuit adapted for use in a motor vehicle.

To incorporate the interlock system of the invention in a motor vehicle such as an automobile, van, truck, etc., the control circuit 120 of FIG. 7 can be replaced by the control circuit 121 of FIG. 8. The two circuits are similar but subcircuits designed to monitor the vehicle battery voltage, ignition key-in, ignition switch, and service brake input signals are used in circuit 121 of FIG. 8 to replace the schematically shown release switch 170 of FIG. 7.

The ignition key-in sensor (schematically illustrated, also see FIGS. 1-2) and ignition switch (schematically shown) are conventional and known, for example, as used in the Ford Aerostar minivan. The service brake signal typically is generated by a conventional brake light switch 210a (schematically illustrated in FIGS. 1-2) of the vehicle.

In FIG. 8, the "Park" switch 114 is a normally closed (N.C.) switch instead of the normally open (N.O.) switch used in FIG. 7.

The vehicle battery voltage is monitored so that the interlock system will not be placed in the locked state if the battery were to go dead. This is accomplished through a 5 volt regulator 200 and an under-voltage sensor 202. The regulator 200 provides a 5 volt signal that will not change until the input voltage falls below an internal threshold (about 7 volts). When the input falls below threshold level, the output signal of sensor 202 falls proportionally. The undervoltage sensor 202 has a logic level output signal that is high if the input is above 4.5 volts and low otherwise. The output signal drives the B input signal low to disengage the interlock system.

The ignition key-in, ignition switch, and service brake signals are logically combined to drive the B input signal low if (a) the ignition key is in the ignition 'OR' the ignition switch 204 (FIGS. 1-2) is in a non-lock (run or start) position 'AND' (b) the service brake 210 (FIGS. 1-2) is applied. It is necessary to 'OR' the ignition key-in and ignition switch input signals since in some vehicles the key-in signal is not available when the ignition switch is in the run or the start position. In order to combine the input signals, they must be converted to transistor-to-transistor logic (TTL) signals since TTL gates G4 and G5 are used in the control circuit 121 of FIG. 8. The key-in input signal does not need to be converted. The ignition switch signal is converted by transistor Q5 and resistor R10 while the brake signal is converted by transistor Q6 and resistor R9. The system must also be isolated from the vehicle; diodes D5, D6, D7, D8, D9, and resistors R6 and R7 perform this function. The gates G4 and G5 function according to Table E.

TABLE E

| INPUT X | INPUT Y | OUTPUT |
|---|---|---|
| low | low | high |
| low | high | low |
| high | low | low |
| high | high | low |

The key-in input signal and ignition switch input signal are combined to form input F to gate G4 while the converted service brake input signal forms input H to gate G4. Table F shows input F as a function of the key and ignition switch conditions while table G shows input H as a function of the service brake conditions.

TABLE F

| KEY | IGNITION | INPUT F |
|---|---|---|
| in | lock position | low |
| in | non-lock position | low |
| out/NA | lock position | high |
| out/NA | non-lock position | low |

(N/A) not available

TABLE G

| SERVICE BRAKE | INPUT H |
|---|---|
| applied | low |
| not applied | high |

The output of G4 gate is connected to both inputs of G5. Resistor R11 is a pull-up resistor to 5 volts. Configured this way, the output of gate G5 will be low when the input of gate G5 is high and high when the input is low. The output of gate G5 (the B input) as a function of the ignition key, ignition switch, and service brake conditions is shown in table H.

TABLE H

| KEY | IGNITION | SERVICE BRAKE | INPUT B |
|---|---|---|---|
| in | lock | applied | low |
| in | lock | not applied | high |
| in | non-lock | applied | low |
| in | non-lock | not applied | high |
| out/NA | lock | applied | high |
| out/NA | lock | not applied | high |
| out/NA | non-lock | applied | low |
| out/NA | non-lock | not applied | high |

The B input is made up of the undervoltage sensor signal, gate G5 signal, resistor R8 and the "Park" switch 114. The under-voltage sensor 202 and gate G5 signals (outputs) are such that they need a pull-up resistor (R8) for a logic high when connected together. This produces a logical 'AND' of the signals.

In other words, when any of the signals connected together is in a low state, the result is a low state. The "Park" switch 114, when closed (shifter lever 26 not in "Park" position), also produces a logic low at the B input. This logic low produces the desired logic in the interlock system.

The motor driving circuit C1 interfaces the gates G1, G2, G3 to the electrical interlock actuator 102 and effects energization of the actuator 102 in the manner described hereinabove with respect to FIG. 7.

When the shifter is in the "Park" position with the pushbutton shaft 42 released (i.e., the shift lever is retained by the detent means), the interlock system will disengage (i.e., be in the unlocked state) only if 1. The vehicle battery voltage falls below a threshold of 7 volts
2.
   (a). The ignition key is inserted in the ignition switch 204 'OR' the ignition switch 204 is in the non-lock position (i.e., the run or start position) 'AND'
   (b). The service brake 210 is depressed.

Also, the interlock system will disengage (i.e., be in the unlocked state) if

1. The shift lever 26 is in any position other than the "Park" position with the pushbutton shaft 42 released 'OR'
2. The vehicle battery is below a threshold of 7 volts.

Figure 6:
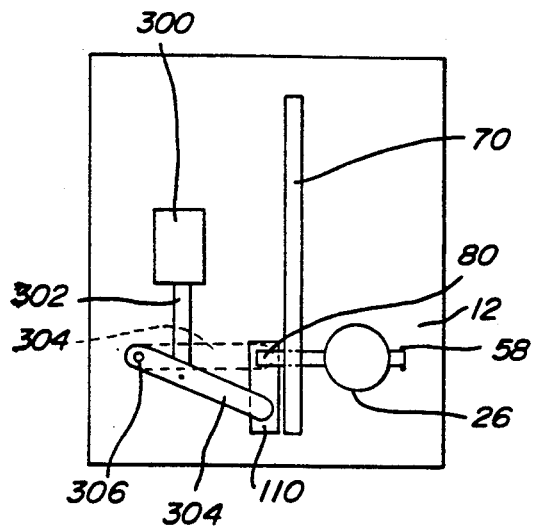
FIG. 6 is a somewhat schematic top elevation of another embodiment of the inventive interlock system.

Although the interlock system has been described hereinabove as using a bidirectional electric motor driven-linear interlock actuator 102, other actuators can be used. For example, referring to FIG. 6, the interlock system is schematically illustrated using a bidirectional push/pull solenoid actuator 300 that provides an extend input signal and retract input signal in a manner similar to that shown for actuator 102 in FIGS. 4-5.

As shown, the plunger 302 of the solenoid is connected to a locking member 304 that is pivotably mounted (by pin 306) on the frame 12. When the plunger 302 is in the extend position shown in FIG. 6, the locking member 304 is moved from beneath the pawl 80 of the shift lever 26 to free the shift lever 26 for movement between positions P, D, R, N, 1, 2, 3 as explained hereinabove. When the plunger 302 is in the retract position, the locking member 304 is positioned beneath the pawl 80 (see phantom line position of locking member 304) nested in the "Park" slot 72a to prevent shift lever movement from the "Park" position until the vehicle systems (e.g., service brake, ignition key-in, etc.) are placed in the desired states as described hereinabove. A suitable logic control circuit similar to that shown in FIG. 8 can be used to control the solenoid actuator 300.

While the invention has been described in terms of specific embodiments, it is not intended to be limited thereto but rather only to the extent set forth hereafter in the following claims.

I claim:

1. A shift lever interlock system for a vehicle having a transmission with a shift lever, comprising:
   (a) a shift lever means movable between a non-drive position and a drive position,
   (b) detent means for releasably retaining the shift lever means in a selected position,
   (c) an electrical actuator for moving a locking member to a locking position relative to the detent means when the shift lever is retained in the non-drive position by the detent means to prevent movement of the shift lever by the vehicle operator, said actuator including first limit switch means for providing to a control circuit a first input signal representative of said locking member being in the locking position and second limit switch means for providing to the control circuit a second input signal representative of said locking member being in an unlocking position relative to said detent means,
   (d) means for providing to the control circuit a shift lever position input signal representative of said shift lever being retained in the non-drive position by the detent means,
   (e) means for providing to the control circuit at least one vehicle system input signal representative of a vehicle system being in a predetermined condition, and
   (f) said control circuit controlling the actuator in response to the input signals to lock the shift lever as retained in the non-drive position except if the vehicle system is in the predetermined condition.

2. The system of claim 1 wherein the locking member is positioned beneath the detent means when said locking member is in said locking position.

3. The system of claim 1 wherein the actuator comprises a bidirectional electrical motor.

4. The system of claim 3 wherein the bidirectional motor drives a pinion for reciprocating a rack said locking member being coupled to said rack.

5. The system of claim 1 wherein said first limit switch means for providing a first input signal and means second limit switch for providing a second input signal comprise respective first and second sets of spaced apart electrical contacts on said actuator and respective first and second electrical contacting members disposed on said locking member for movement therewith such that said first contacting member engages said first set of contacts when the locking member is in the locking position and said second contacting member engages said second set of contacts when the locking member is in the unlocking position.

6. The system of claim 1 wherein said means for providing a shift lever position input signal comprises a shift lever switch means adjacent said detent means for actuation by said detent means when the shift lever is retained in the non-drive position by said detent means.

7. The system of claim 6 wherein said detent means includes a pawl received in a slot in a detent plate when the shift lever is retained in the non-drive position by said detent means, said pawl actuating said shift lever switch means when the shift lever is retained in the non-drive position.

8. The system of claim 1 wherein said means for providing at least one vehicle system input signal comprises an ignition switch mechanism for providing an ignition switch input signal representative of an ignition switch non-lock position.

9. The system of claim 8 wherein said means for providing at least one vehicle system input signal further comprises a service brake system switch means for providing a brake system input signal representative of the service brake system being in a brake applied mode.

10. The system of claim 9 wherein said means for providing at least one vehicle system input signal further comprises an under-voltage sensor associated with a battery of said vehicle for providing a battery voltage level input signal to said control circuit representative of a battery low voltage condition such that the shift lever is not locked in the non-drive position when the battery low voltage condition exists, regardless of the position of the ignition switch mechanism and the mode of the service brake system.

11. The system of claim 9 wherein said means for providing at least one vehicle system input signal further comprises an ignition key-in sensor for providing an ignition key-in input signal to the control circuit representative of the ignition key being inserted such that the shift lever is locked in the non-drive position except if the service brake is in the brake applied mode and either the ignition switch is in the non-lock position or the ignition key is inserted.

12. The system of claim 11 wherein said control circuit logically combines the input signals to provide a control signal to said actuator to control direction of movement of the locking member either to the locking position or to unlocking position.

13. A shift lever interlock system for a vehicle having a transmission with a shift lever, comprising:
 (a) a shift lever means movable between a non-drive position and a drive position,
 (b) detent means for releasably retaining the shift lever means in a selected position,
 (c) an electrical actuator for moving a locking member to a locking position relative to the detent means when the shift lever is retained in the non-drive position by the detent means to prevent movement of the shift lever by the vehicle operator from the non-drive position,
 (d) first limit switch means of the actuator for providing to a control circuit a first extend input signal representative of said locking member being in the locking position and second limit switch means of the actuator for providing to the control circuit a second retract input signal representative of said locking member being in an unlocking position relative to said detent means,
 (e) means for providing to the control circuit a shift lever position input signal representative of said shift lever being retained in the non-drive position by the detent means,
 (f) means for providing to the control circuit an ignition switch input signal representative of the ignition switch being in a non-lock position,
 (g) means for providing to the control circuit a service brake system input signal representative of the service brake system being in a brake applied mode,
 (h) means for combining said shift lever input signal, said ignition switch input signal and said service brake system input signal to provide a third signal, and
 (i) said control circuit controlling the actuator in response to said first, second and third input signals to lock the shift lever as retained in the non-drive position except if the ignition switch is in the non-lock position and the service brake system is in the brake applied mode.

14. The interlock system of claim 13 further including means for providing an ignition key-in input signal representative of an ignition key being inserted in the ignition switch mechanism.

15. The interlock system of claim 14 wherein the control circuit controls the actuator in response to said input signals to lock the shift lever, as retained in the non-drive position by said detent means, except if the service brake system is in the brake applied mode and either the ignition switch is in the non-lock position or the ignition key is inserted and the service brake system is in the brake applied mode.

16. The interlock system of claim 13 further including means for providing to the control circuit a battery voltage level input signal representative of a low voltage condition of the battery.

17. The interlock system of claim 16 wherein the control circuit controls the actuator in response to said input signals to not lock the shift lever, as retained in the non-drive position by said detent means when the battery low voltage condition exists, regardless of whether or not the ignition switch is in the non-lock position and the service brake system is in the brake applied mode.

18. A shift lever interlock system for a vehicle having a transmission with a shift lever, comprising;
 (a) a shift lever means movable between a non-drive position and a drive position,
 (b) detent means for releasably retaining the shift lever means in a selected position,
 (c) an electrical actuator for moving a locking member to a locking position relative to the detent means when the shift lever is retained in the non-drive position by the detent means to prevent movement of the shift lever by the vehicle operator,
 (d) first limit switch means of the actuator for providing to a control circuit a first input signal representative of said locking member being in the locking position and second limit switch means of the actuator for providing to the control circuit a second input signal representative of said locking member being in an unlocking position relative to said detent means,
 (e) mans for providing to the control circuit a shift lever position input signal representative of said shift lever being retained in the non-drive position by the detent means,
 (f) means for providing to the control circuit at least one vehicle system input signal representative of a vehicle system being in a predetermined condition,
 (g) means for combining said shift lever position input signal and said at least one vehicle system input signal to provide a third signal, and
 (h) said control circuit controlling the actuator in response to the first, second and third input signals to lock the shift lever as retained in the non-drive position except if the vehicle system is in the predetermined condition.

19. The system of claim 18 wherein said first means for providing a first input signal and second means for providing a second input signal comprise respective first and second sets of spaced apart electrical contacts on said actuator and respective first and second electrical contacting members disposed on said locking member for movement therewith such that said first contacting member engages said first set of contacts when the locking member is in the locking position and said second set of contacts when the locking member is in the unlocking position.

20. The system of claim 18 wherein said means for providing a shift lever position input signal comprises a shift lever switch means adjacent said detent means for actuation by said detent means when the shift lever is retained in the non-drive position by said detent means.

21. The system of claim 20 wherein said detent means includes a pawl received in a slot in a detent plate when the shift lever is retained in the non-drive position by said detent means, said pawl actuating said shift lever switch means when the shift lever is retained in the non-drive position.

22. The system of claim 18 wherein said means for providing at least one vehicle system input signal comprises a service brake system switch means for providing a brake system input signal representative of the service brake system being in a brake applied mode.

23. The system of claim 22 wherein said means for providing at least one vehicle system input signal further comprises an ignition switch mechanism for providing an ignition switch input signal representative of an ignition switch non-lock position.

24. The system of claim 23 wherein said means for providing at least one vehicle system input signal further comprises an ignition key-in sensor for providing an ignition key-in signal to the control circuit representative of the ignition key being inserted except if the service brake system is in the brake applied mode and either the ignition switch is in the non-lock position or the ignition key is inserted.

25. The system of claim 18 wherein said means for providing at least one vehicle system input signal further comprises an under-voltage sensor associated with a battery of said vehicle for providing a battery voltage level input signal to the control circuit representative of a battery low voltage condition such that the shift lever is not locked in the non-drive position when the battery low voltage condition exists, regardless of whether or not the vehicle system is in the predetermined condition.

26. The system of claim 25 wherein said control circuit logically combines the input signals to provide a control signal to said actuator to control direction of movement of the locking member either to the locking position or to unlocking position.

27. A shift lever interlock system for a vehicle having a transmission with a shift lever comprising:
(a) a shift lever means movable between a non-drive position and a drive position,
(b) detent means for releasably retaining the shift lever means in a selected position,
(c) an electrical actuator for moving a locking member to a locking position relative to the detent means when the shift lever is retained in the non-drive position by the detent means to prevent movement of the shift lever by the vehicle operator,
(d) means for providing to a control circuit an input signal representative of the position of said locking member,
(e) means for providing to the control circuit a shift lever position input signal representative of said shift lever being retained in the non-drive position by the detent means,
(f) means for providing to the control circuit at least one vehicle system input signal representative of a vehicle system being in a predetermined condition,
(g) means for providing to the control circuit a battery voltage level input signal representative of a low battery voltage condition, and
(h) said control circuit controlling the actuator in response to the input signals to lock the shift lever as retained in the non-drive position except if the vehicle system is in the predetermined condition or the low battery voltage condition exists.

28. The system of claim 27 wherein said means for providing a shift lever position input signal comprises a shift lever switch means adjacent said detent means for actuation by said detent means when the shift lever is retained in the non-drive position by said detent means.

29. The system of claim 28 wherein said detent means includes a pawl received in a slot in a detent plate when the shift lever is retained in the non-drive position by said detent means, said pawl actuating said shift lever switch means when the shift lever is retained in the non-drive position.

30. The system of claim 27 wherein said means for providing at least one vehicle system input signal comprises an ignition switch mechanism for providing an ignition switch input signal representative of an ignition switch non-lock position.

31. The system of claim 30 wherein said means for providing at least one vehicle system input signal further comprises an ignition key-in sensor for providing an ignition key-in input signal representative of the ignition key being inserted.

32. The system of claim 27 wherein said means for providing at least one vehicle system input signal further comprises a service brake system switch means for providing a brake system input signal representative of the service brake system being in a brake applied mode.

33. The system of claim 27 wherein said means for providing a battery voltage level input signal comprises an under-voltage sensor associated with a battery of said vehicle for providing a battery voltage level input signal representative of a battery low voltage condition.

34. A shift lever interlock system for a vehicle having a transmission with a shift lever, comprising:
(a) a shift lever means movable between a non-drive position and a drive position,
(b) detent means for releasably retaining the shift lever means in a selected position,
(c) an electrical actuator for moving a locking member to a locking position relative to the detent means when the shift lever is retained in the non-drive position by the detent means to prevent movement of the shift lever by the vehicle operator from the non-drive position,
(d) means for providing to a control circuit an input signal representative of the position of said locking member,
(e) means for providing to the control circuit a shift lever position input signal representative of said shift lever being retained in the non-drive position by the detent means, (f) means for providing to the control circuit an ignition switch input signal representative of the ignition switch being in a non-lock position, (g) means for providing to the control circuit a service brake system input signal representative of the service brake system being in a brake applied mode, (h) means for providing to the control circuit a battery voltage level input signal representative of a low battery voltage condition, and (i) said control circuit controlling the actuator in response to the input signals to lock the shift lever as retained in the non-drive position except if the ignition switch is in the non-lock position and the service brake system is in the brake applied mode or except if the low battery voltage condition exists.

35. The interlock system of claim 34 further including means for providing an ignition key-in input signal representative of an ignition key being inserted in the ignition switch mechanism.

36. The interlock system of claim 35 wherein the control circuit controls the actuator in response to said input signals to lock the shift lever, as retained in the non-drive position by said detent means, except if (a) the service brake system is in the brake applied mode and either the ignition switch is in the unlocked position or the ignition key is inserted or except if (b) the low battery voltage condition exists.

37. A shift lever interlock system for a vehicle having a transmission with a shift lever, comprising:

(a) a shift lever means movable between a non-drive position and a drive position, (b) detent means for releasably retaining the shift lever means in a selected position, (c) an electrical actuator for moving a locking member to a locking position relative to the detent means when the shift lever is retained in the non-drive position by the detent means to prevent movement of the shift lever by the vehicle operator from the non-drive position, (d) means for providing to a control circuit an input signal representative of the position of said locking member, (e) means for providing to the control circuit a shift lever position input signal representative of said shift lever being retained in the non-drive position by the detent means, (f) means for providing to the control circuit an ignition key-in input signal representative of an ignition being inserted in an ignition switch mechanism, (g) means for providing to the control circuit a service brake system input signal representative of the service brake system being in a brake applied mode, (h) means for providing to the control circuit a battery voltage level input signal representative of a low battery voltage condition, and (i) said control circuit controlling the actuator in response to the input signals to lock the shift lever as retained in the non-drive position except if the ignition key is in the key-in position and the service brake system is in the brake applied mode or except if the low battery voltage condition exists.

38. The system of claim 37 further comprising an ignition switch mechanism for providing an ignition switch input signal representative of an ignition switch non-lock position.

39. The system of claim 38 wherein said means for providing a battery voltage level input signal comprises an under-voltage sensor associated with a battery of said vehicle for providing a battery voltage level input signal representative of a battery low voltage condition.

40. The interlock system of claim 37 wherein the control circuit controls the actuator in response to said input signals to lock the shift lever, as retained in the non-drive position by said detent means, except if (a) the service brake system is in the brake applied mode and either the ignition key is in the key-in position or the ignition switch is in the unlocked position or except if (b) the low battery voltage condition exists.

* * * * *